United States Patent [19]

Irwin

[11] Patent Number: 4,766,256

[45] Date of Patent: Aug. 23, 1988

[54] ANISOTROPIC MELT POLYESTERS WITH IMPROVED GLASS TRANSITION TEMPERATURE

[75] Inventor: Robert S. Irwin, Wilmington, Del.

[73] Assignee: E. I. Du Pont de Nemours and Company, Wilmington, Del.

[21] Appl. No.: 63,456

[22] Filed: Jun. 18, 1987

Related U.S. Application Data

[62] Division of Ser. No. 912,082, Sep. 29, 1986, Pat. No. 4,719,280.

[51] Int. Cl.$^4$ ................................................ C07C 39/10
[52] U.S. Cl. .................................... 568/765; 560/141; 560/144
[58] Field of Search ......................... 568/765; 260/694

[56] References Cited

U.S. PATENT DOCUMENTS 2,899,334  8/1959  Crevling et al. ............... 428/913 X
4,439,596  3/1984  Irwin ................................. 568/765

OTHER PUBLICATIONS

Chemical Abstracts, vol. 82, 1975, Abstract No. 155657m, McOmie et al.

Primary Examiner—Michael L. Shippen

[57] ABSTRACT

Novel melt-spinnable anisotropic-melt-forming polyesters from certain disubstituted hydroquinones and terephthalic acid have high glass transition temperatures.

5 Claims, No Drawings

ANISOTROPIC MELT POLYESTERS WITH IMPROVED GLASS TRANSITION TEMPERATURE

BACKGROUND OF THE INVENTION

This is a division of application Ser. No. 912,082, filed Sept. 29, 1986, now U.S. Pat. No. 4,719,280.

Poly(phenyl-1,4-phenylene terephthalate) and copolymers thereof are taught in Payet U.S. Pat. No. 4,159,365. The homopolymer exhibits a relatively high glass transition temperature (Tg) compared with most fiber-forming, anisotropic melt polyesters, which allows it to be employed in applications in which it is exposed to relatively high temperatures without significant diminution of properties. While it is melt-spinnable, its rather high melting point requires the use of spin temperature higher than normally desirable. Poly(t-butyl-1,4-phenylene terephthalate) requires substantial comonomer to reduce melting point and permit melt spinnability. The provision of monomers for more easily processable polyesters with relatively high Tg is a worthwhile objective.

SUMMARY OF THE INVENTION

The present invention provides a method for preparing 2-chloro-5-hydrocarbyl hydroquinones by reacting a mono-hydrocarbyl hydroquinone with sulfuryl chloride in the presence of glacial acetic acid. It also provides a melt-spinnable polyester consisting essentially of recurring units of the formula a. 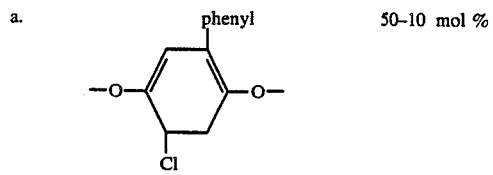 50-10 mol % b. 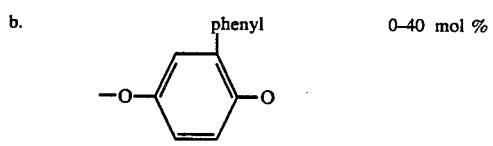 0-40 mol % and c. 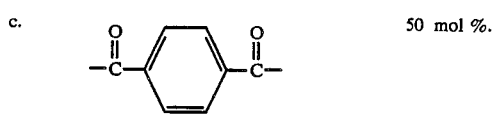 50 mol %.

It further provides a melt-spinnable polyester consisting essentially of recurring units of the formula a. 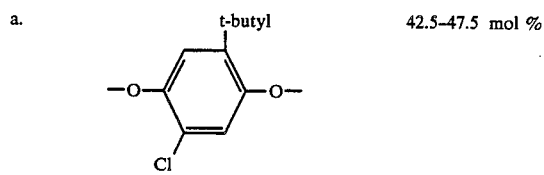 42.5-47.5 mol % b. 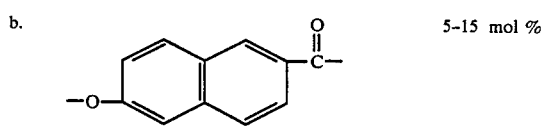 5-15 mol %

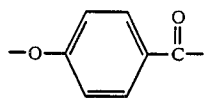

or

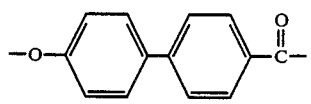

and c. 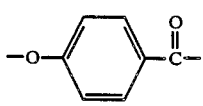 42.5-47.5 mol %

Yet another polyester group contemplated by the present invention consists essentially of recurring units of the formula a. 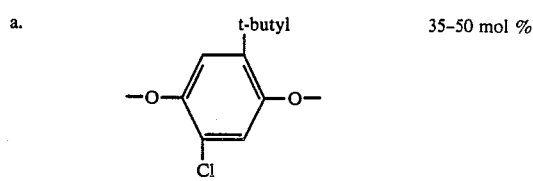 35-50 mol % b. 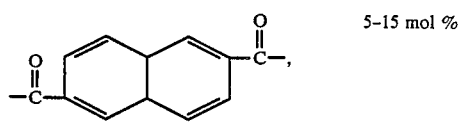 5-15 mol %

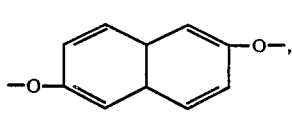

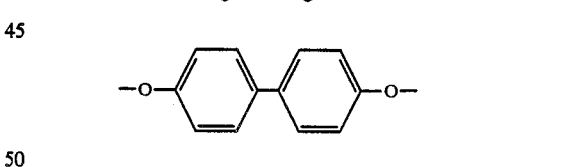

or

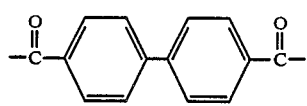

and c. 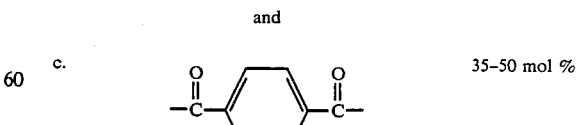 35-50 mol %

Shaped articles and particularly fibers of such polymer are also part of this invention. Finally the precursor 2-chloro-5-phenyl-hydroquinone and its diacetate are comprehended by this invention.

DETAILED DESCRIPTION OF THE INVENTION

One aspect of the present invention is a process for obtaining a 2-chloro-5-hydrocarbyl hydroquinone in high yield. Hydrocarbyl is intended to represent a hydrocarbon radical. The process comprises treating a mono-hydrocarbyl hydroquinone with an approximately equimolar amount of sulfuryl chloride in the presence of an amount of glacial acetic acid preferably sufficient to provide a solution of the hydroquinone and the chlorinated reaction product. The monohydrocarbyl hydroquinone that is employed in this reaction conforms to the formula:

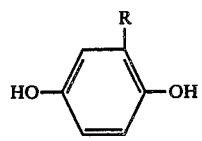

where R is alkyl or aryl of up to seven carbon atoms. Thus, R may be methyl, t-butyl, phenyl or tolyl. The reaction conditions that may be employed are substantially the same as those disclosed in U.S. Pat. No. 4,439,596. The result of this process is the placement of a chlorine substituent almost exclusively in a position para to the hydrocarbyl substituent. Surprisingly, no significant chlorination of the hydrocarbyl substituent takes place, nor is there any significant chlorine substituent placement at locations other than the position para to the hydrocarbyl substituent.

Among the compounds produced by this process is 2-chloro-5-phenylhydroquinone. This product, particularly in the form of its diacetate, is useful in the production of optically anisotropic-melt-forming polyesters having a high Tg. The diacetate of 2-chloro-5-t-butylhydroquinone is also useful for this purpose. Certain anisotropic melt-forming polyesters using these monomers have unique features. For one thing, they exhibit a considerably and unexpectedly lower melting point than closely related polyesters and often a higher Tg. The latter permits an extended temperature range of use. The lower melting point means that the spinning temperature can be reduced well below the temperature of incipient thermal degradation.

TESTS AND MEASUREMENTS

Inherent viscosity ($\eta$inh) is determined at 30° C. in TM4PP, a mixture of 7.5% trifluoroacetic acid/17.5% methylene chloride/12.5% dichlorotetrafluoroacetone/12.5% "Perclene"/50% 4-chlorophenol, using a polymer concentration of 0.5 g/dl. The units of $\eta$inh are, therefore, dl/g.

Thermal behavior was usually determined using a Differential Scanning Calorimeter (DSC) attachment with a Du Pont 1090 Thermal Analyzer. Glass transition temperature, Tg, and melting point (endothermic peak temperature) were obtained from curves run at 20° C./min heating rate. Occasionally melting point was estimated using a Differential Thermal Analyzer (DTA) cell.

Tensile properties are determined on a conventional "Instron" Tensile Tester on single filaments conditioned at 21.1° C. (70° F.) and 65% relative humidity using a 2.5 cm gauge length. Results are reported as an average of at least three determinations. T is tenacity at break in gpd, M is the initial modulus in gpd and E is the break elongation in %.

The following examples are represented to illustrate the invention and are not intended as limiting:

EXAMPLE 1

Preparation of 2-chloro-5-phenylhydroquinone and its diacetate 124 g phenylhydroquinone (0.666 mole) in 1200 ml acetic acid, under a $N_2$ blanket and with an attachment to carry away HCl and $SO_2$ byproducts for dissolution in water, was treated at room temperature with 54 ml $SO_2Cl_2$ (90 g; 0.666 equiv.), for a 3-hour period. Stirring was continued 1 hour longer. The light brown, clear solution was freed of $SO_2$ and HCl by bubbling through nitrogen. Solvent was distilled off under reduced pressure.

The crude product was acetylated (for ease of isolation) by refluxing with 600 ml acetic anhydride and 2 ml pyridine for 5 hr. The solvent was distilled off and the residue fractionated through a 25 ml Vigereux column at about 0.5 mm mercury. The distillate at 165° C. had purity in the 65–73% range, as determined by gas chromatography. It was recrystallized from ethanol (about 5×) to m.p. 100°–101.5° C. representing 95.6% purity. A second crystallization from methanol (about 3×) gave m.p. 100.5°–102.5° C. and 98.9% purity. Its composition, as 2-chloro-5-phenylhydroquinone diacetate was confirmed by nuclear magnetic resonance (NMR).

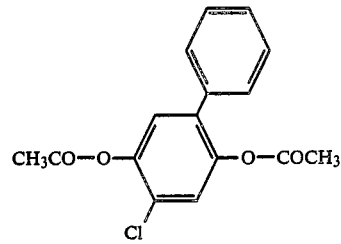

EXAMPLE 2

Preparation of poly(2-chloro-5-phenyl-1,4-phenyleneterephthalate)

A mixture of 15.84 g of the diacetate of Example 1 (0.052 mole; 4% excess) and 8.30 g terephthalic acid (0.05 mole) was heated with stirring under a slow stream of nitrogen in a 250 ml round bottomed flask, in a Wood's metal bath. The temperature was raised from 200° to 350° C. during 60 min at atmospheric pressure, then held at 350° C. during 10 min while pressure was reduced progressively from 25 to 1.0 mm mercury. The light-colored polymer had $\eta$inh=1.16 in TM4PP. It softened on a hot bar at 300° C. The thermooptical test, (TOT), (see Schaefgen U.S. Pat. No. 4,118,372) showed that the melt, above a flow temperature of 316° C. was anisotropic. D.T.A. showed a melting point of roughly 330° C.

This polymer was molded to a cylindrical plug and, in a melt-spinning apparatus, heated to a temperature of 320° C. and extruded through a spinneret orifice (dia.=0.009 in) under a pressure of 1100 psi. Fiber was wound up at 600 ypm. Spinnability was excellent and fibers had a high lustre. Fibers were heat treated in a relaxed condition by heating progressively during about 6 hr to a maximum temperature (Tmax) of 298° C. and held at this temperature for 7 hr under a slow flow of nitrogen. The as-spun fiber had a peak DSC melting endotherm at 349° C., a T/E/M of 2.7/2.1/213 and a Tg of about 150° C. The heat treated fiber had a T/E/M of 19.5/6.6/313 and a Tg of 173° C.

EXAMPLE 3

Preparation of 2-chloro-5-t-butylhydroquinone Diacetate 54.0 ml $SO_2Cl_2$ (90 g; 0.666 mole) was reacted with 110.6 g t-butylhydroquinone (0.666 mole) in 1200 ml glacial acetic acid, under a slow current of nitrogen, with stirring at room temperature during 4 hr. Nitrogen was bubbled through the clear, light brown solution to sweep away $SO_2$ and HCl. Acetic acid was distilled off to leave a black crystalline product. This was acetylated directly by refluxing with 600 ml acetic anhydride for 5 hr. Solvent was distilled off. The solid residue was distilled through a 25 cm Vigereux column at 130° C./0.7 mm of mercury. The product was crystallized from ethanol to give m.p. 73°–76.5° C. (96.9% purity). This was deemed satisfactory for polymerization experiments. The 2-chloro-5-t-butylhydroquinone diacetate was identified by NMR.

EXAMPLE 4

Preparation and Spinning of Polymer from 2-Chloro-5-t-butyl-hydroquinone Diacetate, Terephthalic Acid and 2,6-Hydroxynaphthoic Acid A mixture of 13.44 g of the diacetate of Example 3 (0.047 mole), 8.30 g of terephthalic acid (0.05 mole; 6% excess) and 1.17 g of the acetate of 2,6-hydroxynaphthoic acid (0.005 mole) was polymerized following the procedure of Example 2. The temperature was raised from 210° C. to 350°–355° C. in 65 minutes, then held at 350°–355° C. for 10 minutes while the pressure was reduced progressively from 25 to 2 mm Hg. The polymer had an inherent viscosity of 1.15 (1.23 after washing with acetone) in TM4PP. The polymer softened and fibers could be pulled on a hot bar at 285° C. The TOT test showed that the polymer melt was anisotropic above its flow temperature of 288° C. The DSC melting point was about 302° C.

The polymer was extracted with acetone and was best spun (followed the procedure of Example 2) at 500 psi from a plug heated to 305° C. The fiber was wound up at 600 ypm. Spinnability was excellent and fibers had a high lustre. The fiber was heat treated as before (Example 2) with a Tmax of 298° C.

Properties are as follows:
Tg=170° C. (Polymer)
T/E/M
"As-spun" Fiber—3.6/1.7/237
Heat Treated—18.5/5.6/360

EXAMPLE 5

Preparation and Spinning of Polymer from 2-Chloro-5-t-butyl-Hydroquinone Diacetate, Terephthalic Acid and 1,4-Hydroxy-Benzoic Acid A mixture of 8.07 g of the diacetate of Example 3 (0.028 mole; 5% excess), 4.48 g of terephthalic acid (0.027 mole) and 1.08 g of the acetate of 1,4-hydroxybenzoic acid (0.006 mole) was polymerized following the procedure of Example 2. The temperature was raised from 210° C. to 350° C. in 60 minutes, then held at 350° C. for 6 minutes while the pressure was reduced progressively from 25 to 1 mm Hg. The polymer had an inherent viscosity of 1.26 in TM4PP. The polymer softened at 256° C. and fibers could be pulled on a hot bar at 275° C. The TOT test showed that the polymer melt was anisotropic above its flow temperature of 280° C. The DSC melting point was about 294° C.

This polymer was spun following the procedure of Example 2 from a plug heated to 300° C. at a pressure of 900 psi. The fiber was wound up at 600 ypm and then heat treated as before (Example 2) at a Tmax of 278° C.

Properties are as follows:
Tg=164° C. (Polymer)
T/E/M
"As-spun" Fiber—4.1/1.6/285
Heat Treated—12.9/4.1/357

EXAMPLE 6

Preparation and Spinning of Polymers from 2-Chloro-5-phenyl-hydroquinone Diacetate, Phenylhydroquinone Diacetate and Terephthalic Acid Four polymers were prepared from 2-chloro-5-phenylhydroquinone (ClPhHQ) diacetate, phenylhydroquinone (PhHQ) diacetate and terephthalic acid (TA) with the following compositions in mole % based on total units—40/10/50, 30/20/50, 20/30/50 and 10/40/50. An excess of 4 mole % of the diacetates was employed. The polymerization followed the general (but not identical) procedure and reaction conditions of Example 2.

| Polymer | Composition ClPhHQ/PhHQ/TA | Polymer Properties Tg (°C.) | DSC M.P. Peak (°C.) | Inherent Viscosity (TM4PP) |
|---|---|---|---|---|
| A | 40/10/50 | 156 | 324 | 1.42 |
| B | 30/20/50 | 160 | 317 | 1.41 |
| C | 20/30/50 | 176 | 310 | 2.20 |
| D | 10/40/50 | 160 | 315 | 2.10 |

The polymer samples were spun and wound up as in Example 2. The following spin conditions yielded the best results:

| POLYMER | TEMP. (°C.) | PRESSURE (PSI) | FIBER PROPERTIES T/E/M |
|---|---|---|---|
| A | 318–320 | 650 | As-spun - 3.6/1.8/251 |
|   |   |   | HT ($T_{MAX}$ = 286° C.) - 20.9/6.7/329 |
| B | 295 | — | As-spun - 3.6/2.2/227 |
|   |   |   | HT ($T_{MAX}$ = 286° C.) - 20.8/6.5/352 |
| C | 310 | 1000 | As-spun - 4.8/1.7/357 |
|   |   |   | HT ($T_{MAX}$ = 286° C.) - 18.4/5.9/324 |
| D | 303–310 | 600 | As-spun - 3.1/1.0/373 |
|   |   |   | HT ($T_{MAX}$ = 286° C.) - 19.3/5.5/357 |

EXAMPLE 7

Preparation of 2-Chloro-5-Methylhydroquinone and its Diacetate 40.5 ml $SO_2Cl_2$ (67.5 g, 0.5 mole) was reacted with 62 g (0.5 mole) methylhydroquinone in 600 ml glacial acetic acid, under a slow current of nitrogen, with stirring at room temperature for 3 hours. Nitrogen was bubbled through the solution to sweep away $SO_2$ and HCl. Acetic acid was distilled off. 43 g of product was added to 300 ml of acetic anhydride (with 2 ml of pyridine) and refluxed for 3 hours. Solvent was removed. The solid residue with a melting point of 110°–112° C.

was recrystallized from ethanol. The recrystallized product had a melting point of 110°–111.5° C. (99.6% purity). Its composition as 2-chloro-5-methyl-hydroquinone diacetate was confirmed by NMR.

I claim:

1. A method for preparing 2-chloro-5-hydrocarbyl hydroquinone comprising reacting a mono-hydrocarbyl hydroquinone with an approximately equimolar amount of sulfuryl chloride in the presence of glacial acetic acid.

2. The method of claim 1 wherein the mono-hydrocarbyl substitutent is alkyl or aryl of up to seven carbon atoms.

3. The method of claim 2 wherein the mono-hydrocarbyl substituent is alkyl.

4. The method of claim 3 wherein the mono-hydrocarbyl substituent is t-butyl.

5. The method of claim 2 wherein the mono-hydrocarbyl substituent is phenyl.

* * * * *